(12) United States Patent
Lu

(10) Patent No.: US 10,268,260 B2
(45) Date of Patent: Apr. 23, 2019

(54) ATX DUAL-OUTPUT POWER SUPPLY UNIT WITH BUCK DETECTION COMPENSATION ABILITY

(71) Applicant: RYANTEK CO., LTD., New Taipei (TW)

(72) Inventor: Liang-Chun Lu, New Taipei (TW)

(73) Assignee: Ryantek Co., Ltd., New Taipei (TW)

( * ) Notice: Subject to any disclaimer, the term of this patent is extended or adjusted under 35 U.S.C. 154(b) by 65 days.

(21) Appl. No.: 15/669,975

(22) Filed: Aug. 7, 2017

(65) Prior Publication Data

US 2019/0041965 A1    Feb. 7, 2019

(51) Int. Cl.
    *G06F 1/3287*    (2019.01)
    *G06F 1/3296*    (2019.01)

(52) U.S. Cl.
    CPC .......... *G06F 1/3287* (2013.01); *G06F 1/3296* (2013.01)

(58) Field of Classification Search
    CPC .............................. G06F 1/3287; G06F 1/3296
    See application file for complete search history.

(56) References Cited

U.S. PATENT DOCUMENTS

| 5,006,782 A * | 4/1991 | Pelly ...................... H02M 3/158 323/225 |
| 2010/0164460 A1* | 7/2010 | Hsiao .................... H02M 3/155 323/284 |

* cited by examiner

*Primary Examiner* — Terrell S Johnson
(74) *Attorney, Agent, or Firm* — C. G. Mersereau; DeWitt LLP

(57) ABSTRACT

An ATX dual-output power supply unit with buck detection compensation ability has a voltage compensation unit connected to a first motherboard and a second motherboard. The power supply unit includes a circuit buck detection unit, a switch buck detection unit, a summarizing unit and a gain-lag comparison unit. The circuit buck detection unit serves to detect the circuit voltage loss between the first and second motherboards to output a circuit loss signal. The switch buck detection unit serves to detect the switch voltage loss between the power supply unit and the first and second motherboards to output a switch loss signal. The summarizing unit serves to summarize the circuit loss signal and the switch loss signal to generate a total buck loss signal. According to the total buck loss signal, the gain-lag comparison unit drives the voltage compensation unit to perform voltage compensation.

10 Claims, 7 Drawing Sheets

US 10,268,260 B2

ATX DUAL-OUTPUT POWER SUPPLY UNIT WITH BUCK DETECTION COMPENSATION ABILITY

BACKGROUND OF THE INVENTION

1. Field of the Invention

The present invention relates generally to an ATX dual-output power supply unit, and more particularly to an ATX dual-output power supply unit with buck detection compensation ability.

2. Description of the Related Art

A PC power supply unit is generally abbreviated as PSU. The PC power supply unit serves to convert the standard AC to low-voltage regulated DC power for the internal components of a computer. Most of the current PC power supply units are switch-type power supply units. The input voltage will be automatically adapted to the civil power parameter of the residence of a user. With respect to some low-level products, it may be necessary for the user to adjust the voltage switch himself/herself. The input voltage of the currently often used ATX specification PC power supply unit generally ranges from 100 Vac to 250 Vac. The frequency is 50 Hz or 60 Hz and three regulated DC voltages of 12V, 5V and 3.3V are output.

Please refer to FIG. 1, which is a block diagram of a conventional single-output ATX power supply unit. The single-output ATX power supply unit serves to supply power for a motherboard and other components such as graphics card, hard disk, processor and compact disk drive. The power supply unit has four output voltages of 5Vsb, 3.3V, 5V and 12V.

In the case that one desktop computer uses two motherboards, each of the motherboards necessitates one power supply unit to independently supply power. In this case, the user needs to prepare two power supply units. As a result, the cost is higher. Also, the occupied room is increased.

It is therefore tried by the applicant to provide an ATX dual-output power supply unit with buck detection compensation ability to solve the above problems.

SUMMARY OF THE INVENTION

It is therefore a primary object of the present invention to provide an ATX dual-output power supply unit, which can automatically detect voltage loss to compensate the voltage.

To achieve the above and other objects, the ATX dual-output power supply unit with buck detection compensation ability of the present invention has a voltage compensation unit connected to a first motherboard and a second motherboard. The ATX dual-output power supply unit includes: a circuit buck detection unit having a first detection pin set, a second detection pin set and a first output end, the first detection pin set serving to detect the circuit voltage loss between the power supply unit and the first motherboard, the second detection pin set serving to detect the circuit voltage loss between the power supply unit and the second motherboard, the first output end serving to output a circuit loss signal; a switch buck detection unit having a third detection pin set, a fourth detection pin set and a second output end, the third detection pin set serving to detect the switch voltage loss between the power supply unit and the first motherboard, the fourth detection pin set serving to detect the switch voltage loss between the power supply unit and the second motherboard, the second output end serving to output a switch loss signal; a summarizing unit having a first end, a second end and a third end, the first end of the summarizing unit being coupled to the first output end of the circuit buck detection unit, the second end of the summarizing unit being coupled to the second output end of the switch buck detection unit, the summarizing unit serving to summarize the circuit loss signal and the switch loss signal to generate a total buck loss signal for the third end of the summarizing unit to output; and a gain-lag comparison unit having a first end and a second end, the first end of the gain-lag comparison unit being coupled to the third end of the summarizing unit, the second end of the gain-lag comparison unit being connected to the voltage compensation unit to drive and perform voltage compensation.

According to the structure of the present invention, the circuit buck detection unit serves to measure the circuit voltage loss of the first and second motherboards and output the greater voltage loss as the circuit loss signal. The switch buck detection unit serves to measure the switch voltage loss of the first and second motherboards and output the greater voltage loss as the switch loss signal. The summarizing unit serves to summarize the circuit loss signal and the switch loss signal to output a total buck loss signal to the gain-lag comparison unit. According to the total buck loss signal, the gain-lag comparison unit drives the voltage compensation unit to perform voltage compensation.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
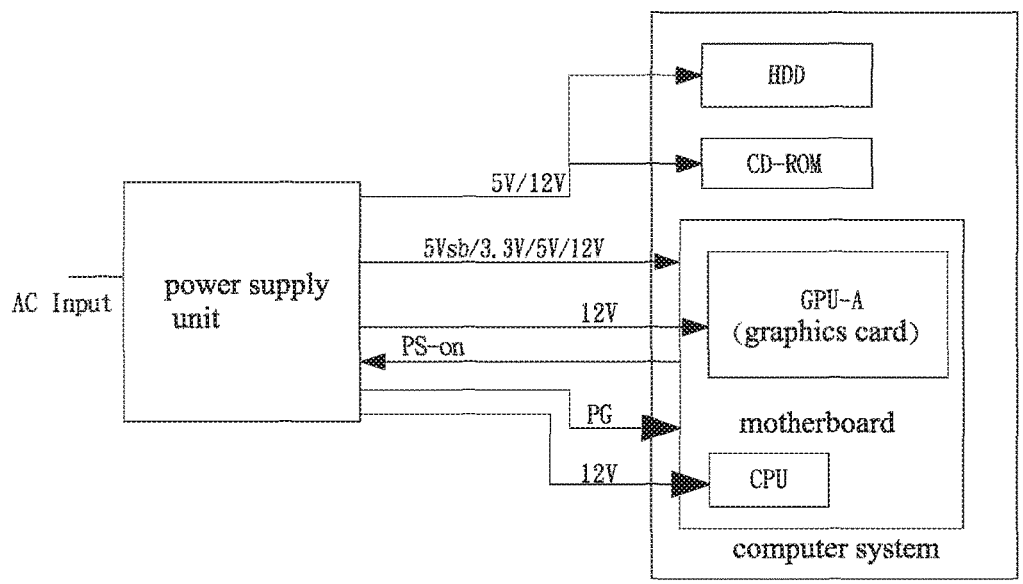
FIG. 1 is a block diagram of a conventional single-output ATX power supply unit.
Figure 2A:
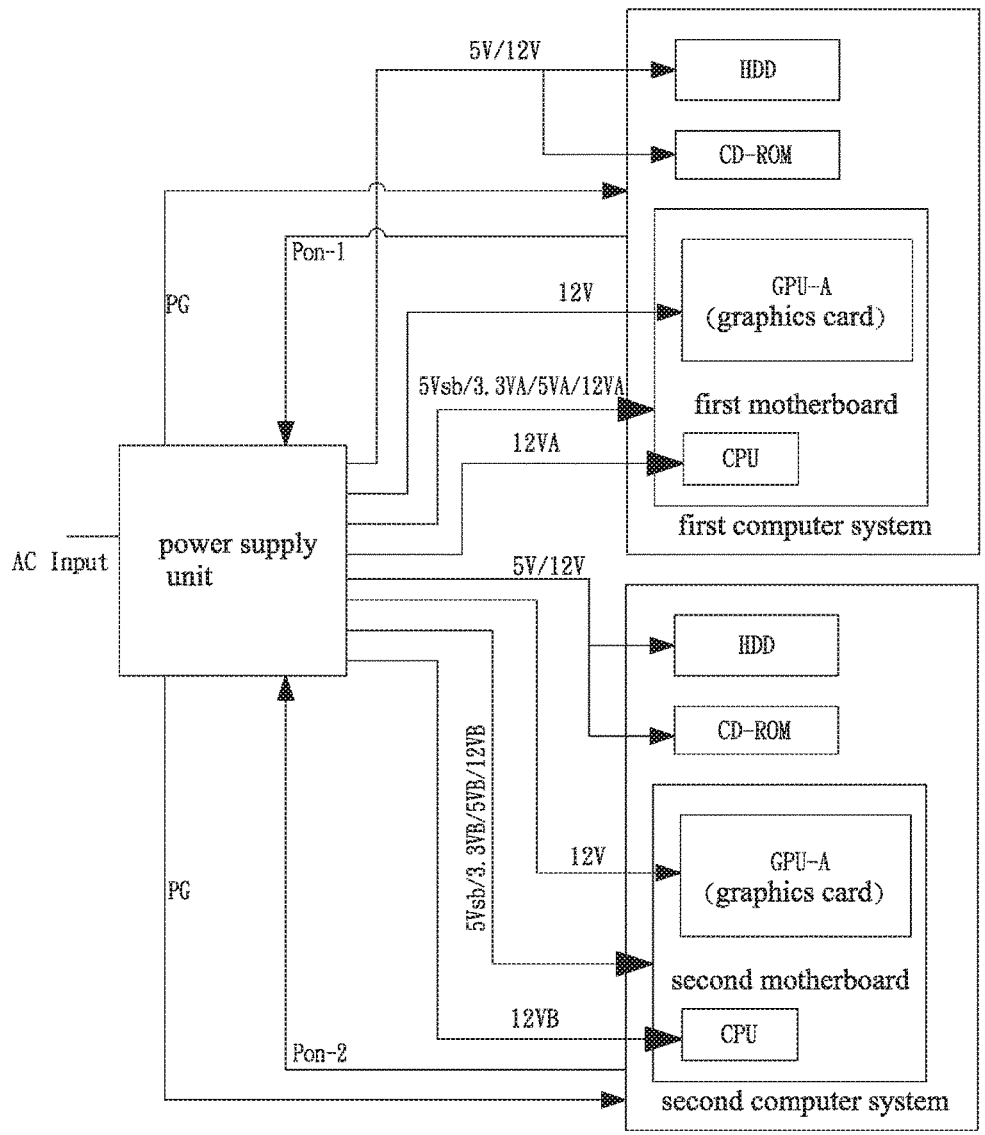
FIG. 2A is a block diagram of the dual-output ATX power supply unit of the present invention.
Figure 2B:
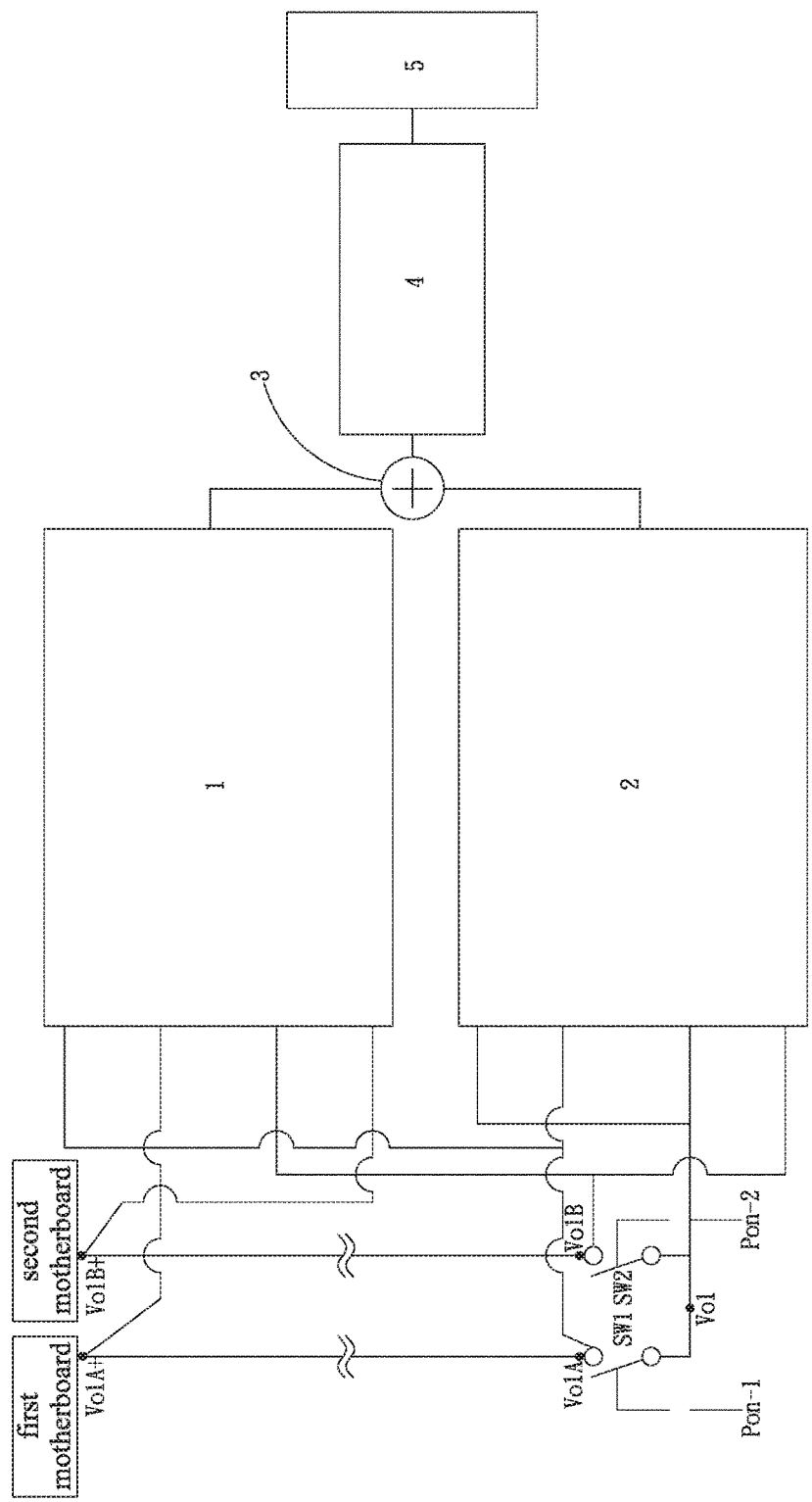
FIG. 2B is a block diagram of a first embodiment of the present invention.
Figure 2C:
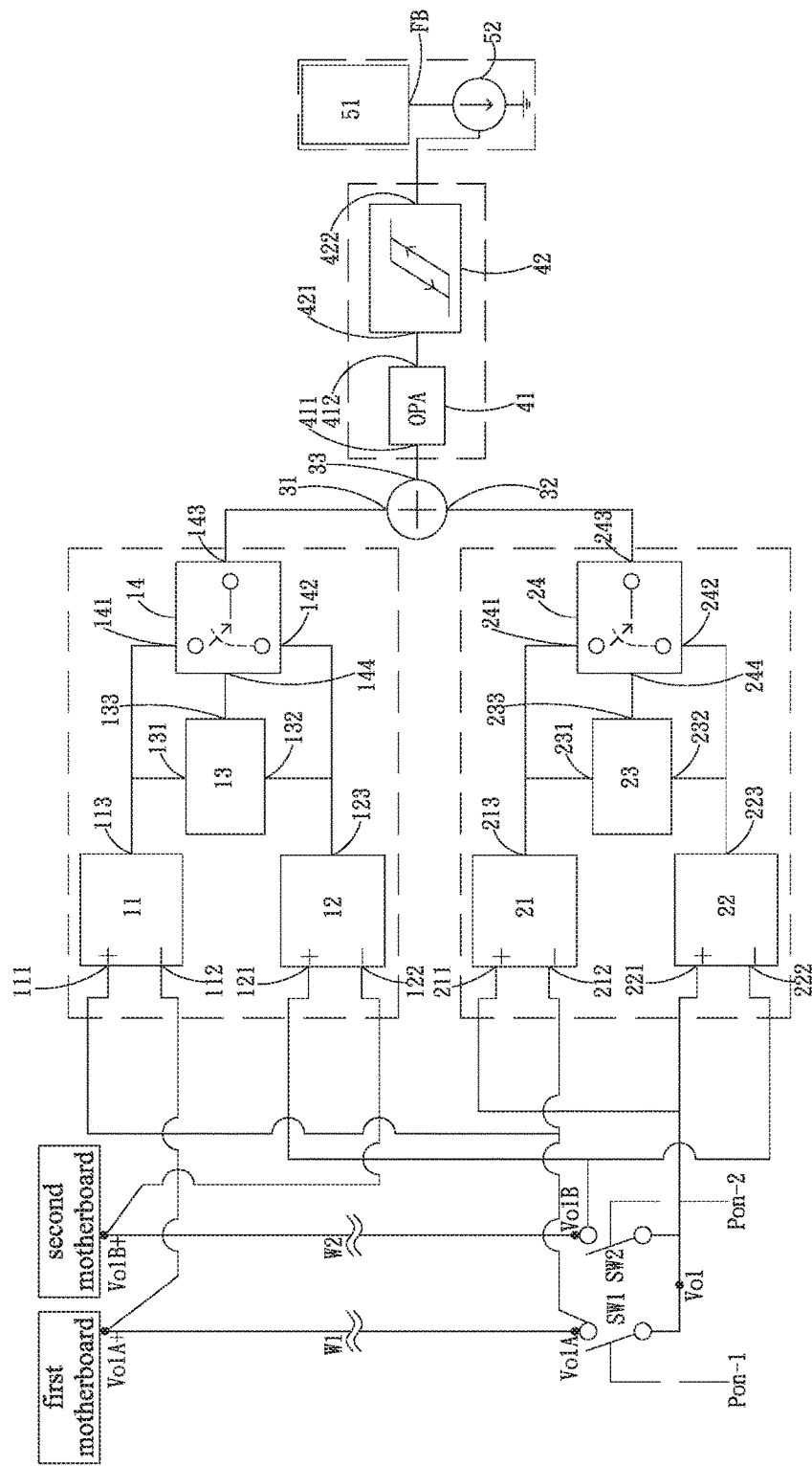
FIG. 2C is a circuit diagram of the first embodiment of the present invention.
Figure 2D:
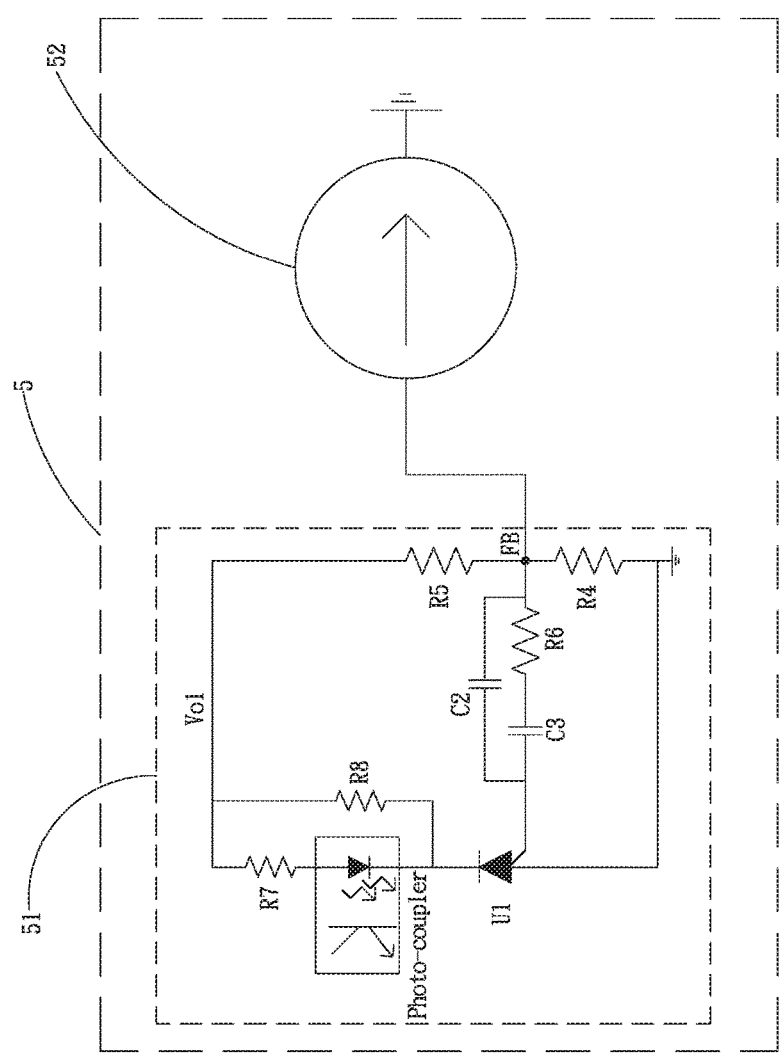
FIG. 2D is a circuit diagram of the voltage compensation unit of the first embodiment of the present invention.

Please refer to FIGS. 2A, 2B, 2C and 2D. FIG. 2A is a block diagram of the dual-output ATX power supply unit of the present invention. FIG. 2B is a block diagram of a first embodiment of the present invention. FIG. 2C is a circuit diagram of the first embodiment of the present invention. FIG. 2D is a circuit diagram of the voltage compensation unit of the first embodiment of the present invention. The dual-output ATX power supply unit of the present invention includes a circuit buck detection unit 1, a switch buck detection unit 2, a summarizing unit 3, a gain-lag comparison unit 4 and a voltage compensation unit 5. A first output end of the circuit buck detection unit 1 is coupled to a first end 31 of the summarizing unit 3. A second output end of the switch buck detection unit 2 is coupled to a second end 32 of the summarizing unit 3. A third end 33 of the summarizing unit 3 is coupled to a first end of the gain-lag comparison unit 4. A second end of the gain-lag comparison unit 4 is connected to the voltage compensation unit 5. The above units are disposed in an ATX dual-output power supply unit. The ATX dual-output power supply unit is connected to a first motherboard and a second motherboard to supply power for the first and second motherboards.

The present invention is first defined as follows:

The measurement point Vol is the original output of the power supply unit. SW1 is a first switch. SW2 is a second switch. W1 is a first circuit. W2 is a second circuit. The voltage loss between the measurement point Vol and the measurement point VolA is exactly the switch voltage loss (referred to for short as the first switch voltage loss hereinafter) between the power supply unit and the first motherboard. The voltage loss between the measurement point Vol and the measurement point VolB is exactly the switch voltage loss (referred to for short as the second switch voltage loss hereinafter) between the power supply unit and the second motherboard. The voltage loss between the measurement point VolA and the measurement point VolA+ is exactly the circuit voltage loss (referred to for short as the first circuit voltage loss hereinafter) between the power supply unit and the first motherboard. The voltage loss between the measurement point VolB and the measurement point VolB+ is exactly the circuit voltage loss (referred to for short as the second circuit voltage loss hereinafter) between the power supply unit and the second motherboard.

The circuit buck detection unit 1 includes a first amplifier 11, a second amplifier 12, a first comparator 13 and a first selector 14. A first end 111 and a second end 112 of the first amplifier 11 form the first detection pin set. The first end 111 is connected to the measurement point VolA. The second end 112 is connected to the measurement point VolA+. The first amplifier 11 measures the first circuit voltage loss and outputs from a third end 113. A first end 121 and a second end 122 of the second amplifier 12 form the second detection pin set. The first end 121 is connected to the measurement point VolB. The second end 122 is connected to the measurement point VolB+. The second amplifier 12 measures the second circuit voltage loss and outputs from a third end 123. A first end 131 of the first comparator 13 and a first end 141 of the first selector 14 are coupled to the third end 113. A second end 132 of the first comparator 13 and a second end 142 of the first selector 14 are coupled to the third end 123. The first comparator 13 compares the first circuit voltage loss and the second circuit voltage loss to find which voltage loss is greater. A third end 133 of the first comparator 13 is coupled to a fourth end 144 of the first selector 14 to output a circuit loss comparison signal. The first selector 14 selectively turns on the amplifier with greater circuit voltage loss, whereby a third end 143 of the first selector 14 outputs a circuit loss signal to the summarizing unit 3.

The switch buck detection unit 2 includes a third amplifier 21, a fourth amplifier 22, a second comparator 23 and a second selector 24. A first end 211 and a second end 212 of the third amplifier 21 form the third detection pin set. The first end 211 is connected to the measurement point Vol. The second end 212 is connected to the measurement point VolA. The third amplifier 21 measures the first switch voltage loss and outputs from a third end 213. A first end 221 and a second end 222 of the fourth amplifier 22 form the fourth detection pin set. The first end 221 is connected to the measurement point Vol. The second end 222 is connected to the measurement point VolB. The fourth amplifier 22 measures the second switch voltage loss and outputs from a third end 223. A first end 231 of the second comparator 13 and a first end 241 of the second selector 24 are coupled to the third end 213. A second end 232 of the second comparator 23 and a second end 242 of the second selector 24 are coupled to the third end 223. The second comparator 23 compares the first switch voltage loss and the second switch voltage loss to find which voltage loss is greater. A third end 233 of the second comparator 23 is coupled to a fourth end 244 of the second selector 24 to output a switch loss comparison signal. The second selector 24 selectively turns on the amplifier with greater switch voltage loss, whereby a third end 243 of the second selector 24 outputs a switch loss signal to the summarizing unit 3.

A first end 31 of the summarizing unit 3 is coupled to the third end 143 of the first selector 14 to receive the circuit loss signal. A second end 32 of the summarizing unit 3 is coupled to the third end 243 of the second selector 24 to receive the switch loss signal. The summarizing unit 3 serves to summarize the circuit loss signal and the switch loss signal to generate a total buck loss signal. A third end 33 of the summarizing unit 3 outputs the total buck loss signal to the gain-lag comparison unit 4.

The gain-lag comparison unit 4 includes a gain operation amplifier 41 and a first lag triggering circuit 42. A first end 411 of the gain operation amplifier 41 is coupled to the third end 33 of the summarizing unit 3. A second end 412 of the gain operation amplifier 41 is coupled to a first end 421 of the first lag triggering circuit 42. The gain operation amplifier 41 serves to amplify the total buck loss signal to avoid the noise interference between the circuits. The first lag triggering circuit 42 resists against the interference via the lag. A second end 422 of the first lag triggering circuit 42 is coupled to the voltage compensation unit 5 to drive and perform the voltage compensation.

The voltage compensation unit 5 includes a voltage feedback circuit 51 and a constant current source 52. The voltage feedback circuit 51 has a reference potential end FB. The constant current source 52 has a first end, a second end and a third end. The second end of the constant current source 52 is coupled to the reference potential end FB. The first end of the constant current source 52 is coupled to the second end 422 of the lag triggering circuit 42. The third end of the constant current source 52 is coupled to a grounding end.

According to the above structure, when either or both of the first switch SW1 and the second switch SW2 are switched on, the circuit buck detection unit 1 and the switch buck detection unit 2 will respectively output the circuit loss signal and the switch loss signal to the summarizing unit 3 to generate the total buck loss signal. The gain-lag comparison unit 4 will drive the voltage compensation unit 5 to perform the voltage compensation. To speak more specifically, when the constant current source 52 receives the signal of the gain-lag comparison unit 4, the constant current source 52 will operate to draw part of current of the voltage feedback circuit 51 from the reference potential end FB. In this case, the voltage feedback circuit 51 is forced to enhance the voltage output of Vol to compensate the switch voltage loss and the circuit voltage loss.

Figure 3A:
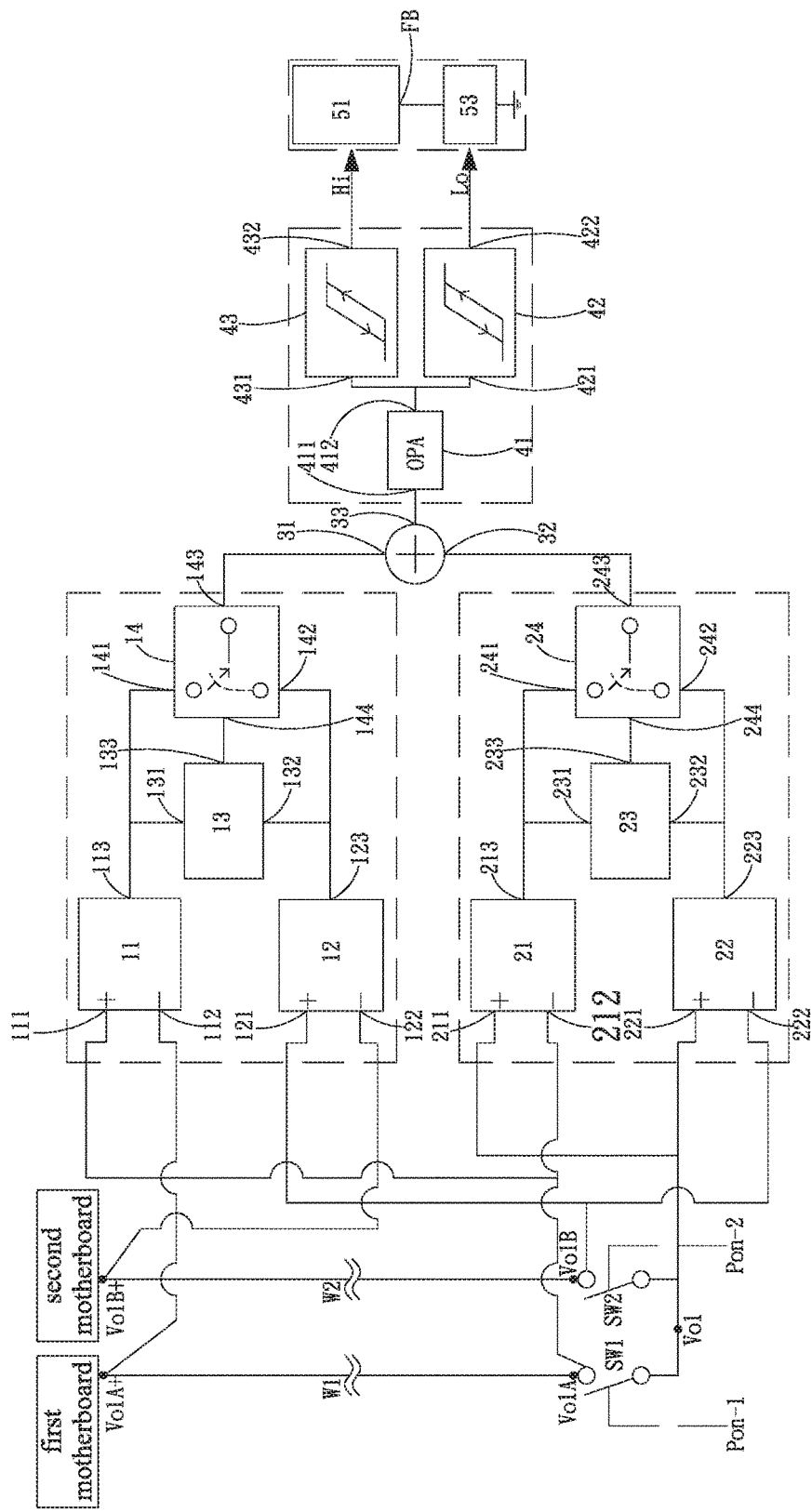
FIG. 3A is a circuit diagram of a second embodiment of the present invention.
Figure 3B:
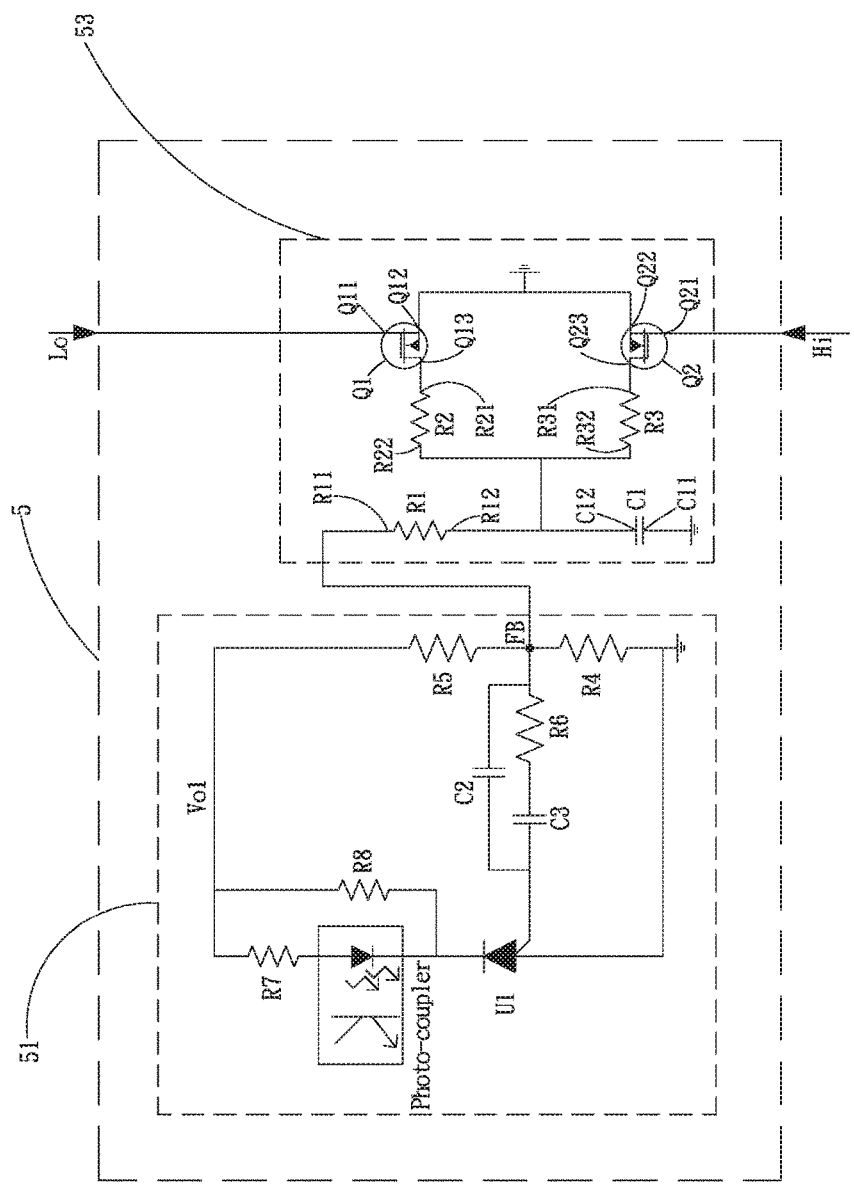
FIG. 3B is a circuit diagram of the voltage compensation unit of the second embodiment of the present invention.

Please now refer to FIGS. 3A and 3B. FIG. 3A is a circuit diagram of a second embodiment of the present invention. FIG. 3B is a circuit diagram of the voltage compensation unit of the second embodiment of the present invention. Also referring to FIG. 2B, the second embodiment is partially identical the first embodiment in structure and thus will not be redundantly described hereinafter. The second embodiment is mainly different from the first embodiment in that the gain-lag comparison unit 4 further includes a second lag triggering circuit 43. A first end 431 of the second lag triggering circuit 43 is coupled to the second end 412 of the gain operation amplifier 41. A second end 432 of the second lag triggering circuit 43 is coupled to the voltage compensation unit 5 to drive and perform the voltage compensation. The voltage compensation unit 5 includes a voltage feedback circuit 51 and a compensation circuit 53. The voltage feedback circuit 51 has a reference potential end FB. The compensation circuit 53 has a first end, a second end and a third end. The second end of the compensation circuit 53 is coupled to the reference potential end FB.

The compensation circuit 53 has a first resistor R1, a second resistor R2, a third resistor R3, a first capacitor C1, a first transistor Q1 and a second transistor Q2. A first end R11 of the first resistor is coupled to the reference potential end FB. Second ends R12, R22, R32 of the first, second and third resistors R1, R2, R3 and a second end C12 of the first capacitor C1 are coupled to each other. A first end C11 of the first capacitor C1 is coupled to a grounding end. A drain Q13 of the first transistor Q1 is coupled to a first end R21 of the second resistor R2. A gate Q11 of the first transistor Q1 is coupled to the second end 422 of the first lag triggering circuit 42. A source Q12 of the first transistor Q1 is coupled to the grounding end. A drain Q23 of the second transistor Q2 is coupled to a first end R31 of the third resistor R3. A gate Q21 of the second transistor Q2 is coupled to the second end 432 of the second lag triggering circuit 43. A source Q22 of the second transistor Q2 is coupled to the grounding end. The first and second transistors Q1, Q2 are N-channel depletion-type transistors. The triggering voltage levels of the first and second lag triggering circuits 42, 43 are different from each other.

In this embodiment, when the total buck loss signal is gradually enhanced to the high voltage level of the first lag triggering circuit 42, the first lag triggering circuit 42 will output high potential to switch on the gate Q11 of the first transistor Q1. At this time, the first capacitor C1 fails and the reference potential end FB is deemed as the first and second resistors R1, R2 are serially connected and then connected to the resistor R4 of the voltage feedback circuit 51 in parallel. The equivalent resistance value from the reference potential end FB to the grounding end is decreased to enhance the current. Accordingly, the voltage feedback circuit 51 is forced to enhance the voltage output of Vol so as to compensate the switch voltage loss and the circuit voltage loss.

To speak more specifically, when the total buck loss signal is further enhanced to the high voltage level of the second lag triggering circuit 43, the second lag triggering circuit 43 will output high potential to switch on the gate Q21 of the second transistor Q2. At this time, the first capacitor C1 fails and the reference potential end FB is deemed as the second and third resistors R2, R3 are connected in parallel and then serially connected to the first resistor R1 and then connected to the resistor R4 of the voltage feedback circuit 51 in parallel. The equivalent resistance value from the reference potential end FB to the grounding end is further decreased to further enhance the current. Accordingly, the voltage feedback circuit 51 is forced to further enhance the voltage output of Vol so as to compensate the switch voltage loss and the circuit voltage loss.

Reversely, when the total buck loss signal is gradually decreased to the low voltage level of the second lag triggering circuit 43, the second lag triggering circuit 43 will output low potential to switch off the gate Q21 of the second transistor Q2. At this time, the equivalent resistance value from the reference potential end FB to the grounding end is slightly increased to slightly decrease the current of the compensation circuit 53. Accordingly, the voltage feedback circuit 51 is forced to decrease the voltage output of Vol so as to reduce the compensation to the switch voltage loss and the circuit voltage loss.

Finally, when the total buck loss signal is gradually decreased to the low voltage level of the first lag triggering circuit 42, the first lag triggering circuit 42 will output low potential to switch off the gate Q11 of the first transistor Q1. At this time, the equivalent resistance value from the reference potential end FB to the grounding end is further increased to decrease the current of the compensation circuit 53. Accordingly, the voltage feedback circuit 51 stops compensating the switch voltage loss and the circuit voltage loss.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. An ATX dual-output power supply unit with buck detection compensation ability, which has a voltage compensation unit connected to a first motherboard and a second motherboard, comprising:
   a circuit buck detection unit having a first detection pin set, a second detection pin set and a first output end, the first detection pin set serving to detect the circuit voltage loss between the power supply unit and the first motherboard, the second detection pin set serving to detect the circuit voltage loss between the power supply unit and the second motherboard, the first output end serving to output a circuit loss signal;
   a switch buck detection unit having a third detection pin set, a fourth detection pin set and a second output end, the third detection pin set serving to detect the switch voltage loss between the power supply unit and the first motherboard, the fourth detection pin set serving to detect the switch voltage loss between the power supply unit and the second motherboard, the second output end serving to output a switch loss signal;
   a summarizing unit having a first end, a second end and a third end, the first end of the summarizing unit being coupled to the first output end of the circuit buck detection unit, the second end of the summarizing unit being coupled to the second output end of the switch buck detection unit, the summarizing unit serving to summarize the circuit loss signal and the switch loss signal to generate a total buck loss signal for the third end of the summarizing unit to output; and
   a gain-lag comparison unit having a first end and a second end, the first end of the gain-lag comparison unit being coupled to the third end of the summarizing unit, the second end of the gain-lag comparison unit being connected to the voltage compensation unit to drive and perform voltage compensation.

2. The ATX dual-output power supply unit with buck detection compensation ability as claimed in claim 1, wherein the circuit buck detection unit includes:
   a first amplifier having a first end, a second end and a third end, the first and second ends of the first amplifier forming the first detection pin set;
   a second amplifier having a first end, a second end and a third end, the first and second ends of the second amplifier forming the second detection pin set;

a first comparator having a first end, a second end and a third end; and a first selector having a first end, a second end, a third end and a fourth end, the third end of the first amplifier being coupled to the first end of the first comparator and the first end of the first selector, the third end of the second amplifier being coupled to the second end of the first comparator and the second end of the first selector, the third end of the first comparator being coupled to the fourth end of the first selector, the third end of the first selector being connected to the first output end.

3. The ATX dual-output power supply unit with buck detection compensation ability as claimed in claim 1, wherein the switch buck detection unit includes:
   a third amplifier having a first end, a second end and a third end, the first and second ends of the third amplifier forming the third detection pin set;
   a fourth amplifier having a first end, a second end and a third end, the first and second ends of the fourth amplifier forming the fourth detection pin set;
   a second comparator having a first end, a second end and a third end; and
   a second selector having a first end, a second end, a third end and a fourth end, the third end of the third amplifier being coupled to the first end of the second comparator and the first end of the second selector, the third end of the fourth amplifier being coupled to the second end of the second comparator and the second end of the second selector, the third end of the second comparator being coupled to the fourth end of the second selector, the third end of the second selector being connected to the second output end.

4. The ATX dual-output power supply unit with buck detection compensation ability as claimed in claim 1, wherein the gain-lag comparison unit includes:
   a gain operation amplifier having a first end and a second end, the first end of the gain operation amplifier being coupled to the third end of the summarizing unit; and
   a first lag triggering circuit having a first end and a second end, the first end of the first lag triggering circuit being coupled to the second end of the gain operation amplifier.

5. The ATX dual-output power supply unit with buck detection compensation ability as claimed in claim 4, wherein the gain-lag comparison unit further includes a second lag triggering circuit having a first end and a second end, the first end of the second lag triggering circuit being coupled to the second end of the gain operation amplifier.

6. The ATX dual-output power supply unit with buck detection compensation ability as claimed in claim 1, wherein the voltage compensation unit includes:
   a voltage feedback circuit having a reference potential end; and
   a constant current source having a first end, a second end and a third end, the second end of the constant current source being coupled to the reference potential end.

7. The ATX dual-output power supply unit with buck detection compensation ability as claimed in claim 1, wherein the voltage compensation unit includes:
   a voltage feedback circuit having a reference potential end; and
   a compensation circuit having a first end, a second end and a third end, the second end of the compensation circuit being coupled to the reference potential end.

8. The ATX dual-output power supply unit with buck detection compensation ability as claimed in claim 7, wherein the compensation circuit includes:
   a first resistor having a first end and a second end, the first end of the first resistor being coupled to the reference potential end;
   a second resistor having a first end and a second end;
   a third resistor having a first end and a second end;
   a first capacitor having a first end and a second end, the first end of the first capacitor being coupled to a grounding end, the second end of the first capacitor and the second ends of the first, second and third resistors being coupled to each other;
   a first transistor having a gate, a source and a drain, the gate of the first transistor being coupled to the first motherboard, the source of the first transistor being coupled to the grounding end, the drain of the first transistor being coupled to the first end of the second resistor; and
   a second transistor having a gate, a source and a drain, the gate of the second transistor being coupled to the second motherboard, the source of the second transistor being coupled to the grounding end, the drain of the second transistor being coupled to the first end of the third resistor.

9. The ATX dual-output power supply unit with buck detection compensation ability as claimed in claim 8, wherein the first transistor is an N-channel depletion-type transistor.

10. The ATX dual-output power supply unit with buck detection compensation ability as claimed in claim 8, wherein the second transistor is an N-channel depletion-type transistor.

* * * * *